(12) United States Patent
Stuart et al.

(10) Patent No.: US 10,655,537 B2
(45) Date of Patent: *May 19, 2020

(54) INTERDIGITATED COUNTER ROTATING TURBINE SYSTEM AND METHOD OF OPERATION

(71) Applicant: General Electric Company, Schenectady, NY (US)

(72) Inventors: Alan Roy Stuart, Cincinnati, OH (US); Jeffrey Donald Clements, Mason, OH (US); Richard Schmidt, Loveland, OH (US); Thomas Ory Moniz, Loveland, OH (US)

(73) Assignee: General Electric Company, Schenectady, NY (US)

( * ) Notice: Subject to any disclaimer, the term of this patent is extended or adjusted under 35 U.S.C. 154(b) by 531 days.

This patent is subject to a terminal disclaimer.

(21) Appl. No.: 15/412,197

(22) Filed: Jan. 23, 2017

(65) Prior Publication Data

US 2018/0209335 A1 Jul. 26, 2018

(51) Int. Cl.
*F01D 1/24* (2006.01)
*F02C 3/04* (2006.01)
(Continued)

(52) U.S. Cl.
CPC .......... *F02C 3/04* (2013.01); *F01D 1/24* (2013.01); *F01D 5/03* (2013.01); *F01D 5/06* (2013.01);
(Continued)

(58) Field of Classification Search
None
See application file for complete search history.

(56) References Cited

U.S. PATENT DOCUMENTS 2,360,130 A * 10/1944 Heppner ............... F02C 3/067
60/268
2,548,975 A * 4/1951 Hawthorne ........... F02C 3/073
60/268

(Continued)

FOREIGN PATENT DOCUMENTS

GB 544909 A * 5/1942 ............ F02C 3/067

*Primary Examiner* — Gerald L Sung
*Assistant Examiner* — Marc J Amar
(74) *Attorney, Agent, or Firm* — Dority & Manning, P.A.

(57) ABSTRACT

The present disclosure is directed to a method of operating a gas turbine engine with an interdigitated turbine section. The engine includes a fan rotor, an intermediate pressure compressor, a high pressure compressor, a combustion section, and a turbine section in serial flow arrangement. The turbine section includes, in serial flow arrangement, a first stage of a low speed turbine rotor, a high speed turbine rotor, a second stage of the low speed turbine rotor, an intermediate speed turbine rotor, and one or more additional stages of the low speed turbine rotor. The low speed turbine rotor is coupled to the fan rotor via a low pressure shaft. The intermediate speed turbine rotor is coupled to the intermediate pressure compressor via an intermediate pressure shaft. The high speed turbine rotor is coupled to the high pressure compressor via a high pressure shaft. The method includes rotating the low speed turbine rotor in a first direction along the circumferential direction; rotating the high speed turbine rotor in a second direction opposite of the first direction along the circumferential direction; and rotating the intermediate speed turbine rotor in the second direction.

20 Claims, 4 Drawing Sheets

(51) Int. Cl.
  *F02C 7/36*   (2006.01)
  *F02K 3/06*   (2006.01)
  *F02C 3/067*  (2006.01)
  *F02K 3/072*  (2006.01)
  *F01D 5/03*   (2006.01)
  *F01D 5/06*   (2006.01)
  *F01D 5/14*   (2006.01)

(52) U.S. Cl.
  CPC ............ *F01D 5/141* (2013.01); *F01D 5/146* (2013.01); *F02C 3/067* (2013.01); *F02C 7/36* (2013.01); *F02K 3/06* (2013.01); *F02K 3/072* (2013.01); *F05D 2220/32* (2013.01); *F05D 2250/38* (2013.01); *F05D 2260/40311* (2013.01)

(56) References Cited

U.S. PATENT DOCUMENTS

| | | | |
|---|---|---|---|
| 3,034,298 A | 5/1962 | White | |
| 3,903,690 A | 9/1975 | Jones | |
| 4,159,624 A * | 7/1979 | Gruner | F02C 3/107 60/268 |
| 4,704,862 A | 11/1987 | Dennison et al. | |
| 4,790,133 A * | 12/1988 | Stuart | F02C 3/067 415/65 |
| 4,860,537 A | 8/1989 | Taylor | |
| 5,307,622 A * | 5/1994 | Ciokajlo | F02C 3/067 415/65 |
| 5,361,580 A * | 11/1994 | Ciokajlo | F01D 25/162 60/226.1 |
| 5,363,641 A * | 11/1994 | Dixon | F02C 6/08 60/226.1 |
| 5,443,590 A * | 8/1995 | Ciokajlo | F01D 5/02 415/192 |
| 6,272,844 B1 * | 8/2001 | Rakhmailov | F01D 5/081 416/95 |
| 6,546,713 B1 | 4/2003 | Hidaka et al. | |
| 6,666,017 B2 | 12/2003 | Prentice et al. | |
| 6,763,652 B2 * | 7/2004 | Baughman | F02C 3/067 415/199.5 |
| 6,763,654 B2 * | 7/2004 | Orlando | F01D 1/24 60/226.1 |
| 7,185,484 B2 * | 3/2007 | Griffin, III | F01D 1/24 415/68 |
| 7,269,938 B2 * | 9/2007 | Moniz | F01D 25/16 415/68 |
| 7,290,386 B2 * | 11/2007 | Orlando | F01D 1/26 415/65 |
| 7,334,392 B2 * | 2/2008 | Moniz | F01D 1/24 60/204 |
| 7,334,981 B2 * | 2/2008 | Moniz | F01D 25/16 29/889.2 |
| 7,451,592 B2 * | 11/2008 | Taylor | F01D 1/26 60/268 |
| 7,510,371 B2 * | 3/2009 | Orlando | F01D 5/141 415/191 |
| 7,513,102 B2 * | 4/2009 | Moniz | F01D 5/14 60/226.1 |
| 8,365,510 B2 | 2/2013 | Lugg | |
| 8,464,426 B2 * | 6/2013 | Kirchner | F01D 5/141 29/889.71 |
| 8,667,775 B1 | 3/2014 | Kisska et al. | |
| 9,103,227 B2 | 8/2015 | Kupratis et al. | |
| 9,494,077 B2 * | 11/2016 | Chanez | F02C 3/067 |
| 9,670,839 B2 * | 6/2017 | Lee | F01D 1/26 |
| 2004/0055276 A1 * | 3/2004 | John Lewis | F02C 3/067 60/226.1 |
| 2004/0060279 A1 * | 4/2004 | Robert Joseph | F01D 1/24 60/226.1 |
| 2005/0241292 A1 * | 11/2005 | Taylor | F01D 1/26 60/226.1 |
| 2006/0032210 A1 * | 2/2006 | Giffin, III | F01D 1/24 60/39.162 |
| 2006/0090451 A1 * | 5/2006 | Moniz | F01D 1/24 60/226.1 |
| 2006/0093464 A1 * | 5/2006 | Moniz | F01D 25/16 415/68 |
| 2006/0093467 A1 * | 5/2006 | Orlando | F01D 1/26 415/68 |
| 2006/0093469 A1 * | 5/2006 | Moniz | F01D 25/16 415/68 |
| 2006/0272314 A1 * | 12/2006 | Moniz | F01D 5/14 60/226.1 |
| 2006/0275111 A1 * | 12/2006 | Orlando | F01D 5/141 415/191 |
| 2008/0184694 A1 * | 8/2008 | Guimbard | F01D 1/26 60/224 |
| 2008/0286107 A1 * | 11/2008 | Clemen | F01D 5/141 416/223 A |
| 2010/0089019 A1 | 4/2010 | Knight et al. | |
| 2013/0259643 A1 * | 10/2013 | Schwarz | F02C 3/067 415/68 |
| 2014/0290209 A1 * | 10/2014 | Lee | F01D 1/26 60/39.162 |
| 2014/0338336 A1 * | 11/2014 | Cunha | F01D 9/023 60/737 |
| 2016/0069260 A1 | 3/2016 | Speak et al. | |
| 2016/0102607 A1 | 4/2016 | Hiernaux | |
| 2018/0209274 A1 * | 7/2018 | Zatorski | F01D 25/12 |
| 2018/0209335 A1 * | 7/2018 | Stuart | F02C 3/04 |
| 2018/0209336 A1 * | 7/2018 | Stuart | F02C 3/06 |
| 2018/0223732 A1 * | 8/2018 | Clements | F02C 3/107 |
| 2018/0274365 A1 * | 9/2018 | Stuart | F01D 9/041 |
| 2018/0320632 A1 * | 11/2018 | Clements | F02C 3/067 |
| 2018/0340423 A1 * | 11/2018 | Stuart | F01D 5/082 |
| 2018/0340446 A1 * | 11/2018 | Stuart | F16C 32/0625 |
| 2018/0340469 A1 * | 11/2018 | Stuart | F02C 7/06 |
| 2018/0340470 A1 * | 11/2018 | Stuart | F02C 7/06 |
| 2019/0085710 A1 * | 3/2019 | van der Merwe | F01D 11/025 |
| 2019/0085711 A1 * | 3/2019 | Gibson | F01D 5/03 |

\* cited by examiner

INTERDIGITATED COUNTER ROTATING TURBINE SYSTEM AND METHOD OF OPERATION

FIELD

The present subject matter relates generally to gas turbine engine architecture. More particularly, the present subject matter relates to a turbine section for gas turbine engines.

BACKGROUND

Gas turbine engines generally include a turbine section downstream of a combustion section that is rotatable with a compressor section to rotate and operate the gas turbine engine to generate power, such as propulsive thrust. General gas turbine engine design criteria often include conflicting criteria that must be balanced or compromised, including increasing fuel efficiency, operational efficiency, and/or power output while maintaining or reducing weight, part count, and/or packaging (i.e. axial and/or radial dimensions of the engine).

Conventional gas turbine engines generally include turbine sections defining a high pressure turbine in serial flow arrangement with an intermediate pressure turbine and/or low pressure turbine. The high pressure turbine includes an inlet or nozzle guide vane between the combustion section and the high pressure turbine rotor. Conventionally, combustion gases exiting the combustion section define a relatively low velocity compared to a velocity (e.g., along a circumferential or tangential direction) of the first rotating stage of the turbine, generally defined as the high pressure turbine rotor. Thus, conventionally, the nozzle guide vane serves to accelerate a flow of combustion gases exiting the combustion section to more closely match or exceed the high pressure turbine rotor speed along a tangential or circumferential direction. Such acceleration of flow using a nozzle guide vane to match or exceed high pressure turbine rotor speed is known to improve general engine operability and performance.

Thereafter, conventional gas turbine engine turbine sections generally include successive rows or stages of stationary and rotating airfoils, or vanes and blades, respectively. This conventional configuration generally conditions a flow of the combustion gases entering and exiting each stage of vanes and blades. However, conventional turbine sections, and especially stationary airfoils (i.e. vanes and nozzle guide vanes) require considerable quantities and masses of cooling air to mitigate damage due to hot combustion gases. For example, generally, nozzle guide vanes are designed to withstand a maximum combustion gas temperature along an annulus (i.e. hot spots), which may be significantly larger than an average combustion gas temperature along the annulus. Thus, conventional engines are designed to use significant quantities or masses of cooling air from a compressor section or unburned air from the combustion section to mitigate structural damage, wear, deterioration, and ultimately, maintenance and repair, of the nozzle guide vanes. However, this cooling air adversely affects overall engine efficiency, performance, fuel consumption, and/or operability by removing energy that could otherwise be used in combustion to drive the turbines, compressors, and fan. Still further, the nozzle guide vane is often a limiting component when determining maintenance and repair intervals for gas turbine engines, thereby limiting overall engine performance and efficiency.

A known solution to improve turbine section efficiency is to interdigitate the rotors of the turbine section (i.e. successive rows or stages of rotating airfoils or blades). For example, a known solution is to configure a turbine section, in serial flow arrangement from an upstream end to a downstream end along a longitudinal direction, with a nozzle guide vane, a high pressure turbine rotor, another turbine vane stage (i.e. stationary airfoils), and an intermediate pressure turbine interdigitated with a low pressure turbine. Another known solution is to configure a turbine section, in serial flow arrangement, with a nozzle guide vane, a high pressure turbine rotor, and various levels of interdigitated rotors thereafter, including low, intermediate, or high pressure turbine rotors.

However, despite various known solutions, there exists a need for an engine including a turbine section that may enable additional stages of interdigitation. Still further, despite various known solutions, there exists a need for a turbine section that may further reduce cooling air consumption, increase engine efficiency, performance, and/or operability, and/or reduce part quantities, weight, and/or packaging (i.e. axial and/or radial dimensions).

BRIEF DESCRIPTION

Aspects and advantages of the invention will be set forth in part in the following description, or may be obvious from the description, or may be learned through practice of the invention.

The present disclosure is directed to a method of operating a gas turbine engine with an interdigitated turbine section. The engine includes a fan rotor, an intermediate pressure compressor, a high pressure compressor, a combustion section, and a turbine section in serial flow arrangement. The turbine section includes, in serial flow arrangement, a first stage of a low speed turbine rotor, a high speed turbine rotor, a second stage of the low speed turbine rotor, an intermediate speed turbine rotor, and one or more additional stages of the low speed turbine rotor. The low speed turbine rotor is coupled to the fan rotor via a low pressure shaft. The intermediate speed turbine rotor is coupled to the intermediate pressure compressor via an intermediate pressure shaft. The high speed turbine rotor is coupled to the high pressure compressor via a high pressure shaft. The method includes rotating the low speed turbine rotor in a first direction along the circumferential direction; rotating the high speed turbine rotor in a second direction opposite of the first direction along the circumferential direction; and rotating the intermediate speed turbine rotor in the second direction.

In one embodiment, the method further includes generating combustion gases in the combustion section; and flowing combustion gases through the turbine section.

In various embodiments, flowing combustion gases through the turbine section defines a relative velocity of the combustion gases in reference to a rotational speed of the low speed turbine rotor at least partially in the circumferential direction and in the longitudinal direction. In one embodiment, flowing combustion gases through the turbine section defines a relative velocity of the combustion gases in reference to the rotational speed of the low speed turbine rotor of approximately 305 m/s or less. In another embodiment, rotating the low speed turbine rotor in the first direction defines a mean velocity of approximately 152 m/s or less. In still another embodiment, rotating the high speed turbine rotor in the second direction defines a mean velocity of approximately 762 m/s or less. In yet another embodiment, flowing combustion gases through the turbine section defines a relative velocity of the combustion gases passing across the first stage of the low speed turbine rotor and in reference thereof of approximately 915 m/s or less at least partially along the circumferential direction and the longitudinal direction. In still yet another embodiment, flowing combustion gases through the turbine section defines a relative velocity of the combustion gases passing across the first stage of the low speed turbine rotor and in reference to the high speed turbine rotor of approximately 152 m/s or less at least partially along the circumferential direction and the longitudinal direction.

Another aspect of the present disclosure is directed to a gas turbine engine defining a longitudinal direction, a radial direction, and a circumferential direction, and an upstream end and a downstream end along the longitudinal direction. The gas turbine engine includes a combustion section forming combustion gases and a turbine section through which the combustion gases flow. The turbine section includes a low speed turbine rotor configured to rotate in a first direction and interdigitated with a high speed turbine rotor. The high speed turbine rotor is configured to rotate in a second direction opposite of the first direction. The gas turbine engine defines, in serial flow arrangement from the upstream end to the downstream end along, the combustion section, a first stage of the low speed turbine rotor, the high speed turbine rotor, and a second stage of the low speed turbine rotor.

In various embodiments, the gas turbine engine defines a relative velocity of the combustion gases in reference to a rotational speed of the low speed turbine rotor at least partially in the circumferential direction and in the longitudinal direction. In one embodiment, the engine defines a relative velocity of the combustion gases in reference to the rotational speed of the low speed turbine rotor of approximately 305 m/s or less. In another embodiment, the low speed turbine rotor is configured to rotate in the first direction at a mean velocity of approximately 152 m/s or less. In yet another embodiment, the high speed turbine rotor is configured to rotate in the second direction at a mean velocity of approximately 762 m/s or less. In still another embodiment, the engine defines a relative velocity of the combustion gases passing across the first stage of the low speed turbine rotor and in reference thereof of approximately 915 m/s or less at least partially along the circumferential direction and the longitudinal direction. In still yet another embodiment, the engine defines a relative velocity of the combustion gases passing across the first stage of the low speed turbine rotor and in reference to the high speed turbine rotor of approximately 152 m/s or less at least partially along the circumferential direction and the longitudinal direction.

In one embodiment, the gas turbine engine further includes an intermediate speed turbine rotor interdigitated with the low speed turbine rotor.

In various embodiments, the gas turbine engine further includes a compressor section comprising a high pressure compressor and an intermediate pressure compressor; and a fan assembly defining one or more rotatable fan stages. The fan assembly, the compressor section, and the turbine section are in serial arrangement, and the low speed turbine rotor is connected and rotatable with the fan assembly by a low pressure shaft. The high speed turbine rotor is connected and rotatable with the high pressure compressor by a high pressure shaft. The intermediate speed turbine rotor is connected and rotatable with the intermediate pressure compressor by an intermediate pressure shaft.

In one embodiment, the fan assembly further comprises a fan rotor and a gearbox, wherein the low pressure shaft is connected and rotatable with the gearbox of the fan assembly from the downstream end of the gearbox, and wherein the fan rotor is connected and rotatable with the gearbox from the upstream end of the gearbox.

In various embodiments, the low speed turbine rotor defines between about 1 and 10 stages. In one embodiment, the low speed turbine rotor defines between about 1 and 5 stages aft or downstream of the connecting airfoil.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
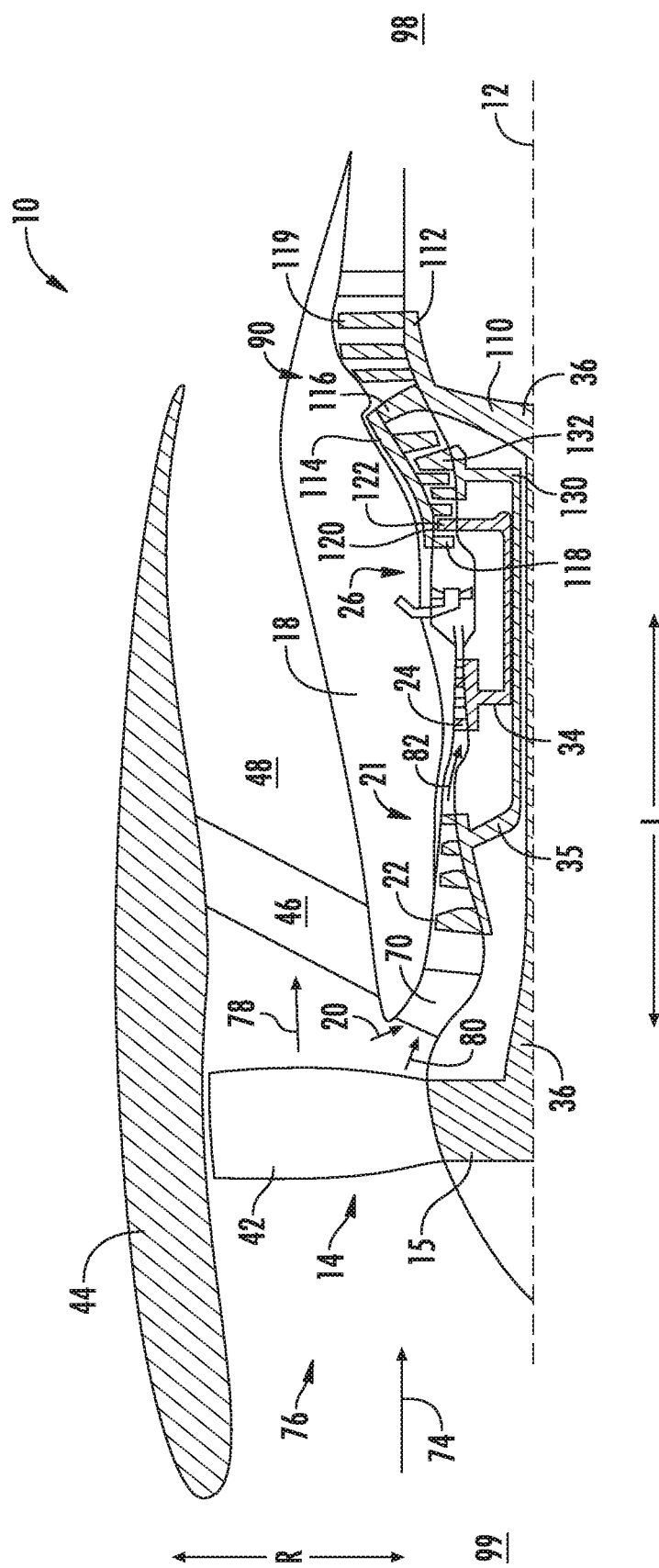
FIG. 1 is a schematic cross sectional view of an exemplary gas turbine engine incorporating an exemplary embodiment of a turbine section according to an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "low", "intermediate", "high", or their respective comparative degrees (e.g. -er, where applicable) each refer to relative speeds within an engine unless otherwise specified. For example, a "low turbine" or "low speed turbine" defines a rotational speed lower than a "high turbine" or "high speed turbine". Alternatively, unless otherwise specified, the aforementioned terms may be understood in their superlative degree. For example, a "low turbine" may refer to the lowest rotational speed turbine within a turbine section, and a "high turbine" may refer to the highest rotational speed turbine within the turbine section.

Embodiments of a gas turbine engine with an interdigitated turbine section are generally provided. The interdigitated turbine section includes a low speed turbine rotor extended in a longitudinal direction, in which the low speed turbine rotor includes an inner shroud, an outer shroud, and at least one connecting airfoil coupling the inner shroud to the outer shroud. The outer shroud includes a plurality of airfoils extended inward along a radial direction. The interdigitated turbine section further includes a high speed turbine rotor and an intermediate speed turbine rotor. The high speed turbine rotor includes a plurality of high speed turbine airfoils extended outward in the radial direction. The intermediate speed turbine rotor includes a plurality of intermediate speed turbine airfoils extended outward in the radial direction. Each of the high speed turbine rotor and the intermediate speed turbine rotor are disposed forward of the one or more connecting airfoils of the low speed turbine rotor and interdigitated between the pluralities of airfoils of the low speed turbine rotor along the longitudinal direction. At least one stage of the plurality of outer shroud airfoils of the low speed turbine rotor is forward or upstream of the high speed turbine rotor.

Exemplary methods of operating the gas turbine engine with interdigitated turbine section include rotating the low speed turbine rotor in a first direction along a circumferential direction, rotating the high speed turbine rotor in a second direction opposite of the first direction along the circumferential direction, and rotating the intermediate speed turbine rotor in the second direction.

The embodiments of the gas turbine engine with interdigitated turbine section shown and described herein, and methods of operation thereof, may enable additional stages of interdigitation of the low speed turbine rotor and the high speed turbine rotor, up to and including one or more stages of the low speed turbine rotor forward or upstream of the high speed turbine rotor. In various embodiments, the gas turbine engine with interdigitated turbine section may further reduce cooling air consumption, increase engine efficiency, performance, and/or operability, and/or reduce part quantities, weight, and/or packaging (i.e. axial and/or radial dimensions). Still further, the interdigitated turbine section may reduce a product of axial flow area and the square of the rotational speed (the product referred to as "$AN^2$") while additionally reducing an average work factor per stage of the turbine section.

Referring now to the drawings, FIG. 1 is a schematic cross sectional view of an exemplary gas turbine engine 10 (herein referred to as "engine 10"), shown as a high bypass turbofan engine, incorporating an exemplary embodiment of a turbine section 90 according to an aspect of the present disclosure. Although further described below with reference to a turbofan engine, the present disclosure is also applicable to turbomachinery in general, including propfan, turbojet, turboprop, and turboshaft gas turbine engines, including marine and industrial turbine engines and auxiliary power units. As shown in FIG. 1, the engine 10 has a longitudinal or axial centerline axis 12 that extends there through for reference purposes. The engine 10 defines a longitudinal direction L, a radial direction R, and an upstream end 99 and a downstream end 98 along the longitudinal direction L.

In general, the engine 10 may include a substantially tubular outer casing 18 that defines an annular inlet 20. The outer casing 18 encases or at least partially flows, in serial flow arrangement, a compressor section 21, a combustion section 26, and an interdigitated turbine section 90 (herein referred to as "turbine section 90"). Generally, the engine 10 defines, in serial flow arrangement from the upstream end 99 to the downstream end 98, the fan assembly 14, the compressor section 21, the combustion section 26, and the turbine section 90. In the embodiment shown in FIG. 1, the compressor section 21 defines a high pressure compressor (HPC) 24 and an intermediate pressure compressor (IPC) 22. In other embodiments, the fan assembly 14 may further include or define one or more stages of a plurality of fan blades 42 that are coupled to and extend outwardly in the radial direction R from a fan rotor 15 and/or a low speed shaft 36. In various embodiments, multiple stages of the plurality of fan blades 42 coupled to the low speed shaft 36 may be referred to as a low pressure compressor (LPC).

An annular fan casing or nacelle 44 circumferentially surrounds at least a portion of the fan assembly 14 and/or at least a portion of the outer casing 18. In one embodiment, the nacelle 44 may be supported relative to the outer casing 18 by a plurality of circumferentially-spaced outlet guide vanes or struts 46. At least a portion of the nacelle 44 may extend over an outer portion (in radial direction R) of the outer casing 18 so as to define a bypass airflow passage 48 therebetween.

Figure 2:
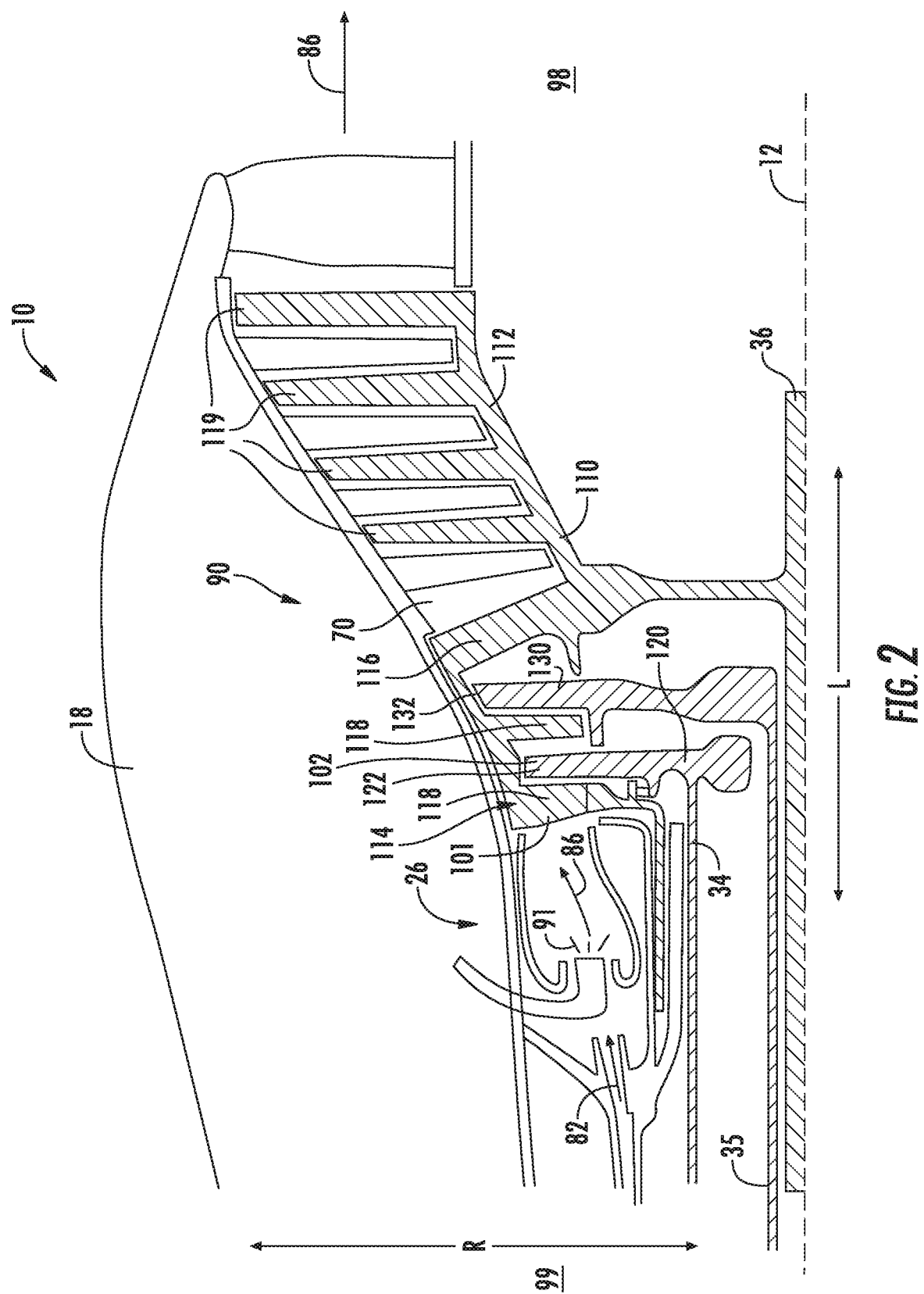
FIG. 2 is a schematic cross sectional view of an embodiment of the turbine section shown in FIG. 1.

Referring now to FIG. 2, an exemplary embodiment of the turbine section 90 of the engine 10 is generally provided. The turbine section 90 includes a low speed turbine rotor 110 extended along the longitudinal direction L. The low speed turbine rotor 110 includes an inner shroud 112, an outer shroud 114, and at least one connecting airfoil 116 coupling the inner shroud 112 to the outer shroud 114. The outer shroud 114 includes a plurality of outer shroud airfoils 118 extended inward along the radial direction R. In various embodiments, the inner shroud 112 may include a plurality of inner shroud airfoils 119 extended outward along the radial direction R.

The inner shroud 112 and the outer shroud 114 each extend generally along the longitudinal direction L. The inner shroud 112 and/or the outer shroud 114 may each extend at least partially in the radial direction R. In various embodiments, the inner shroud 112 extends from the connecting airfoil 116. In one embodiment, the inner shroud 112 further extends toward the downstream end 98 along the longitudinal direction L. In still various embodiments, the outer shroud 114 extends from the connecting airfoil 116 toward the upstream end 99 along the longitudinal direction L toward the combustion section 26.

Referring still to FIG. 2, the turbine section 90 further includes a high speed turbine rotor 120 and an intermediate speed turbine rotor 130 each disposed forward or upstream 99 of the one or more connecting airfoils 116 of the low speed turbine rotor 110. The high speed turbine rotor 120 includes a plurality of high speed turbine airfoils 122 extended outward along the radial direction R. The intermediate speed turbine rotor 130 includes a plurality of intermediate speed turbine airfoils 132 extended outward along the radial direction R. The pluralities of high speed turbine airfoils 122 and intermediate speed turbine airfoils 132 are each disposed among the pluralities of outer shroud airfoils 118 of the low speed turbine rotor 110 along the longitudinal direction L.

In various embodiments, the low speed turbine rotor 110 defines a plurality of stages of rotating airfoils, such as the plurality of outer shroud airfoils 118 disposed along the longitudinal direction L, the one or more connecting airfoils 116, and/or the plurality of inner shroud airfoils 119 disposed along the longitudinal direction L. In one embodiment, the low speed turbine rotor 110 defines at least one stage forward or upstream 99 of the high speed turbine rotor 120. In another embodiment, the turbine section 90 defines a first stage of airfoils in which the first stage includes the plurality of outer shroud airfoils 118 of the low speed turbine rotor 110 forward or upstream 99 of each stage of the high speed turbine rotor 120.

In still various embodiments, such as shown in FIG. 2, the engine 10 defines, in serial flow arrangement along the longitudinal direction L from the upstream end 99 to the downstream end 98, the plurality of outer shroud airfoils 118 of the low speed turbine rotor 110, the plurality of high speed turbine airfoils 122 of the high speed turbine rotor 120, and the plurality of outer shroud airfoils 118 of the low speed turbine rotor 110. In still various embodiments, additional iterations of interdigitation of the low speed turbine rotor 110 and the high speed turbine rotor 120 may be defined forward or upstream 99 of the connecting airfoils 116.

In yet various embodiments, such as shown in FIG. 2, the engine 10 further defines two or more stages of the low speed turbine rotor 110 and one or more stages of the intermediate speed turbine rotor 130 in interdigitation along the longitudinal direction L downstream of the high speed turbine rotor 120. For example, the engine 10 may define, in serial flow arrangement along the longitudinal direction L from the upstream end 99 to the downstream end 98, the combustion section 26, the first stage 101 of the low speed turbine rotor 110, the high speed turbine rotor 120, the low speed turbine rotor 110, the intermediate speed turbine rotor 130, and the low speed turbine rotor 110. In one embodiment, the engine 10 may further define additional stages of interdigitation of the high speed turbine rotor 120 and/or the intermediate speed turbine rotor 130 in interdigitation (i.e. alternating arrangement along the longitudinal direction L) with the low speed turbine rotor 110.

As another non-limiting example, as shown in FIG. 2, the engine 10 may further define the serial flow arrangement of the plurality of outer shroud airfoils 118, the plurality of high speed turbine airfoils 122, the plurality of outer shroud airfoils 118, the plurality of intermediate speed turbine airfoils 132, the plurality of outer shroud airfoils 118, an additional plurality of intermediate speed turbine airfoils 132, and the connecting airfoils 116. It should be appreciated that although FIG. 2 shows the high speed turbine rotor 120 as defining one stage, the high speed turbine rotor 120 may define generally one or more stages between the first stage 101 of the low speed turbine rotor 110 and the connecting airfoils 116 of the low speed turbine rotor 110, and interdigitated therebetween along the longitudinal direction L. Similarly, it should be appreciated that although FIG. 2 shows the intermediate speed turbine rotor 130 as defining two stages, the intermediate speed turbine rotor 130 may define generally one or more stages between the high speed turbine rotor 120 and the connecting airfoils 116 of the low speed turbine rotor 110.

Referring now to FIGS. 1-2, in various embodiments, the low speed turbine rotor 110 is drivingly connected and rotatable with a low speed shaft 36 extended along the longitudinal direction L and generally concentric about the axial centerline 12. In one embodiment, as shown in FIG. 1, the low speed shaft 36 is connected to the fan assembly 14, of which is driven in rotation by the low speed turbine rotor 110 of the turbine section 90. The low speed shaft 36 is connected to the fan rotor 15 of the fan assembly 14. In various embodiments, the fan assembly 14 may define a plurality of stages of the plurality of fan blades 42, of which further define the LPC.

In various embodiments, the intermediate speed turbine rotor 130 is drivingly connected and rotatable with an intermediate speed shaft 35 extended along the longitudinal direction L and generally concentric about the axial centerline 12. In one embodiment, as shown in FIG. 1, the intermediate speed shaft 35 is connected to the IPC 22, of which is driven in rotation by the intermediate speed turbine rotor 130 of the turbine section 90.

Referring still to FIGS. 1-2, the high speed turbine rotor 120 of the turbine section 90 is drivingly connected and rotatable with a high speed shaft 34 extended along the longitudinal direction L and generally concentric about the axial centerline 12. The high speed shaft 34 is connected to the HPC 24, of which is driven in rotation by the high speed turbine rotor 120 of the turbine section 90.

During operation of the engine 10 as shown collectively in FIGS. 1-2, the high speed turbine rotor 120 rotates generally at a higher rotational speed than the intermediate speed turbine rotor 130. The intermediate speed turbine rotor 130 rotates generally at a higher speed than the low speed turbine rotor 110. During operation of the engine 10, a volume of air as indicated schematically by arrows 74 enters the engine 10 through an associated inlet 76 of the nacelle and/or fan assembly 14. As the air 74 passes across the fan blades 42, a portion of the air as indicated schematically by arrows 78 is directed or routed into the bypass airflow passage 48 while another portion of the air as indicated schematically by arrows 80 is directed or through the fan assembly 14. Air 80 is progressively compressed as it flows through the compressor section 21 toward the combustion section 26.

The now compressed air, as indicated schematically by arrows 82, flows into the combustion section 26 where a fuel 91 is introduced, mixed with at least a portion of the compressed air 82, and ignited to form combustion gases 86. The combustion gases 86 flow into the turbine section 90, causing rotary members of the turbine section 90 to rotate and support operation of respectively coupled rotary members in the compressor section 21 and/or fan assembly 14.

In various embodiments, the low speed turbine rotor 110, and the low speed shaft 36 to which it is attached, rotates in a first direction 161 (shown in FIG. 3) along the circumferential direction C. The high speed turbine rotor 120, and the high speed shaft 34 to which it is attached, rotates in a second direction 162 (shown in FIG. 3) opposite of the first direction 161 along the circumferential direction C. In one embodiment, the intermediate speed turbine rotor 130, and the intermediate speed shaft 35 to which it is attached, rotates in the second direction 162 in co-rotation with the high speed turbine rotor 120 and in counter-rotation with the low speed turbine rotor 110. Although further described herein as a counter-rotating turbine engine, in which the low speed turbine rotor 110 rotates in a direction opposite of the high speed turbine rotor 120 and/or intermediate speed turbine rotor 130, it should be understood that the structures provided herein enable the engine 10 to be configured as a co-rotating engine, in which the low speed turbine rotor 110, the high speed turbine rotor 120, and the intermediate speed turbine rotor 130 each rotate in the first direction 161.

It should further be understood that the first direction 161 and the second direction 162 as used and described herein are intended to denote directions relative to one another. Therefore, the first direction 161 may refer to a clockwise rotation (viewed from downstream looking upstream) and the second direction 162 may refer to a counter-clockwise rotation (viewed from downstream looking upstream). Alternatively, the first direction 161 may refer to a counter-clockwise rotation (viewed from downstream looking upstream) and the second direction 162 may refer to a clockwise rotation (viewed from downstream looking upstream).

Figure 3:
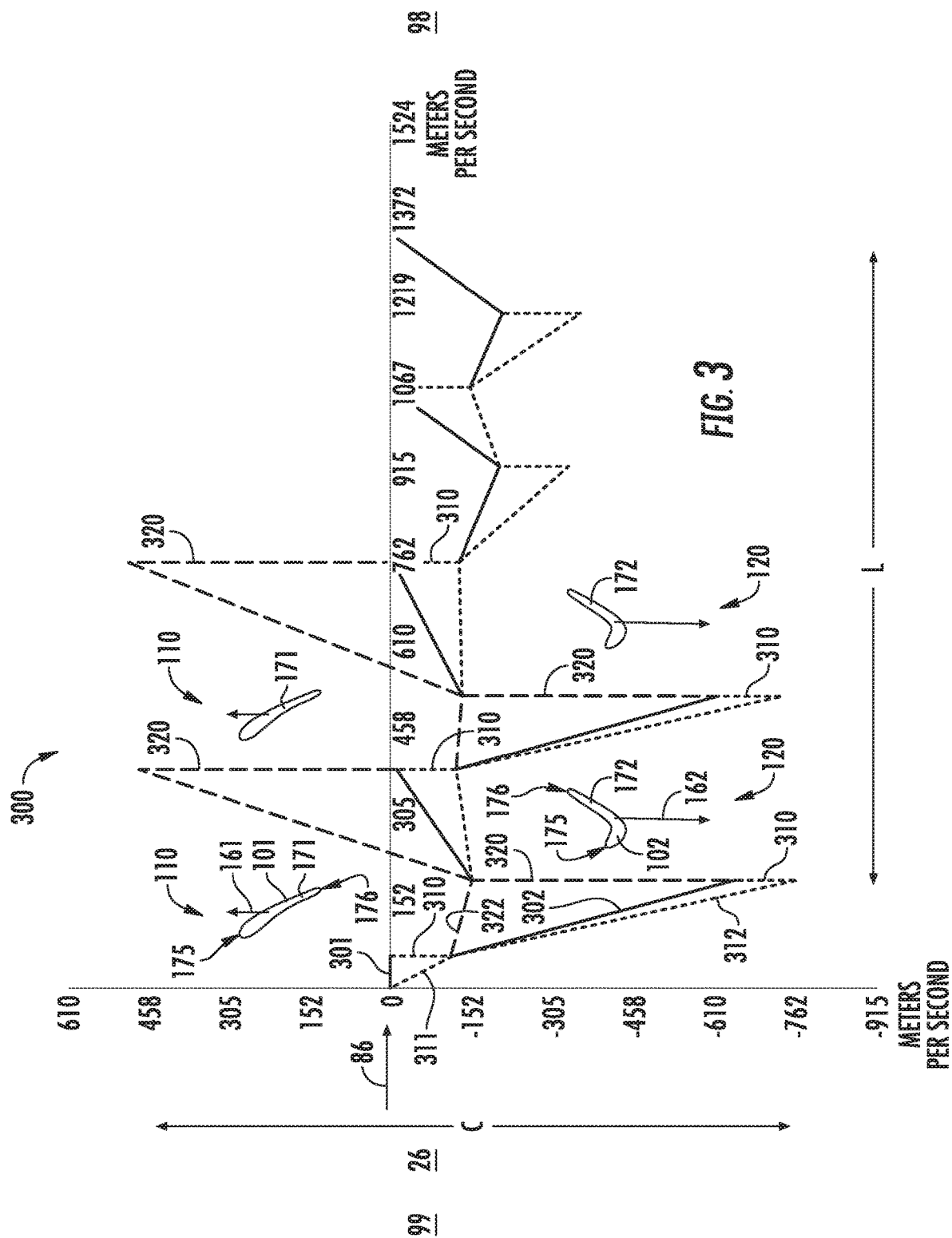
FIG. 3 is cross sectional view depicting exemplary velocity triangles of the turbine section shown in FIG. 3.

Still further during an operation of the engine 10, combustion gases 86 exiting the combustion section 26 define a generally low speed toward the downstream end 98 of the engine 10. A low speed rotation (e.g. along a tangential or circumferential direction C, as shown in FIG. 3) of the first stage 101 of the low speed turbine rotor 110 accelerates a speed of the combustion gases 86, such as in the tangential or circumferential direction C (shown in FIG. 3), to approximately equal or greater than a speed of the high speed turbine rotor 120.

By defining the low speed turbine rotor 110 as the first stage 101 of the turbine section 90 aft or downstream of the combustion section 26, the engine 10 may obviate the need for a first turbine vane or nozzle guide vane to accelerate the combustion gases 86 forward or upstream of the high speed turbine rotor 120 defining a high speed turbine. As such, the engine 10 may reduce a quantity or mass of cooling air from the compressor section 21 and/or combustion section 26, thereby increasing engine efficiency by enabling more energy (i.e. compressed air) to be used during combustion. Additionally, or alternatively, the turbine section 90 may reduce necessary cooling air and enable increased performance and/or operability of the compressor section 21, including surge margin and/or efficiency, or decrease a required amount of work from the compressor section 21, which may reduce axial dimensions or stages of the compressor section 21 and further reduce engine packaging, weight, and/or part count, and generally improve engine 10 performance.

Additionally, obviating the need for the first turbine vane or nozzle guide vane may enable the turbine section 90, or more specifically, the first stage 101, as a rotating stage, to be designed to an average combustion gas 86 temperature rather than designed to accommodate peak temperatures (i.e. high spots) along an annulus of the core flowpath 70 within the combustion section 26. Therefore, as all of the plurality of outer shroud airfoils 118 of the first stage 101 are rotating, all of the plurality of outer shroud airfoils 118 may only transiently endure adverse effects of combustion hot spots rather than substantially sustained or constant exposure to a higher temperature from the combustion gases in contrast to other locations about the annulus of the core flowpath 70. Still further, the turbine section 90 described herein may enable alternative design methods for the combustion section 26 due to a decreased adverse effect of combustion hot spots on the turbine section 90. Therefore, the turbine section 90 may enable design of the combustion section 26 to further improve combustion stability, decrease emissions, increase operability across all or part of a flight envelope, increase altitude re-light performance, and/or decrease lean blowout (LBO).

In various embodiments of the engine 10 including the turbine section 90 shown in FIGS. 1-2, the low speed turbine rotor 110 defines between about 1 and 10 stages (inclusively) i.e. between about 1 and 10 rows or stages of pluralities of rotating airfoils separated along the longitudinal direction L. In one embodiment, the low speed turbine rotor 110 defines between about 2 and 4 rows or stages (inclusively) of plurality of rotating airfoils forward or upstream of the connecting airfoils 116. In another embodiment, the low speed turbine rotor 110 defines at least one stage upstream or forward of the high speed turbine rotor 120 (e.g. the first stage 101). In another embodiment, the low speed turbine rotor 110 defines at least two stages downstream or aft of the high speed turbine rotor 120 (e.g. the connecting airfoil 116, the plurality of outer shroud airfoils 118, and/or the plurality of inner shroud airfoils 119, or combinations thereof).

Referring now to FIG. 3, a graphic representation 300 of exemplary embodiments of velocity triangles relative to the engine 10 are provided. The velocity triangles are a graphic representation of relative fluid velocities and rotor velocities from the combustion section 26 into the turbine section 90. The graphic representation 300 shown in FIG. 3 generally includes the low speed turbine rotor 110 immediately downstream of the combustion section 26 without a nozzle guide vane therebetween. The graphic representation 300 shown in FIG. 3 further includes the low speed turbine rotor 110 in counter rotating interdigitated arrangement with the high speed turbine rotor 120. As shown in FIG. 3, a schematic representation of a low speed turbine airfoil 171 is provided, in which the airfoil 171, and the low speed turbine rotor 110 to which it is attached, are configured to rotate in the first direction 161 along the circumferential direction C. A schematic representation of a high speed turbine airfoil 172 is provided, in which the airfoil 172, and the high speed turbine rotor 120 to which it is attached, are configured to rotate in the second direction 162 along the circumferential direction C, opposite of the first direction 161.

In the embodiment of the graphical representation 300 shown in FIG. 3, a velocity vector representing an absolute velocity of the combustion gases 86 exiting the combustion section 26 and approaching the first stage 101 of the low speed turbine rotor 110 (i.e., the portion of the turbine section 90 immediately downstream of the combustion section 26) is depicted schematically at 301. A mean rotor or airfoil velocity of the low speed turbine rotor 110 is depicted at 310. For example, 310 represents the speed of rotation of the low speed turbine rotor 110 in the first direction 161. A velocity vector representing a relative velocity of the combustion gases 86 in reference to the rotational speed of the low speed turbine rotor 110 in the first direction 161 is depicted schematically at 311. In other words, 311 depicts a relative speed and angle (relative to the longitudinal direction L and the circumferential direction C) of the combustion gases 86 approaching a leading edge 175 of the first stage 101 of the low speed turbine rotor 110.

The velocity triangle depicted by 301, 310, and 311 depict an increase in velocity of the combustion gases 86 induced by the relatively low speed of rotation of the low speed turbine rotor 110 downstream of the combustion section 26 (i.e., in lieu of a nozzle guide vane). In one embodiment, the relative velocity of the combustion gases depicted by 311 may define a speed of approximately three hundred and five (305) meters per second (m/s) or less at least partially along the circumferential direction C and the longitudinal direction L from the combustion section 26 to the leading edge 175 of the first stage 101 of the low speed turbine rotor 110. In another embodiment, the mean rotor or airfoil velocity of the low speed turbine rotor 110 is approximately 152 m/s or less.

Referring still to FIG. 3, a velocity vector representing a relative velocity of the combustion gases 86 passing across the first stage 101 of the low speed turbine rotor 110, and in reference thereof, is depicted schematically at 312. In other words, 312 depicts a relative speed and angle of the combustion gases 86 approaching a trailing edge 176 of the first stage 101 of the airfoil 171 of the low speed turbine rotor 110, or, alternatively, the leading edge 175 of the first high speed turbine rotor stage 102 of the high speed turbine rotor 120. A velocity vector representing an absolute velocity of the combustion gases 86 passing across the first stage 101 of the low speed turbine rotor 110 is depicted schematically at 302. The velocity vector depicting the mean rotor or airfoil velocity of the low speed turbine rotor 110 is depicted at 310. Additionally, a velocity vector depicting a mean rotor or airfoil velocity of the high speed turbine rotor 120 is depicted at 320. For example, 320 represents the speed of rotation of the high speed turbine rotor 120 in the second direction 162. Still further, a velocity vector depicting a relative velocity of the combustion gases 86 in reference to the high speed turbine rotor 120 is depicted schematically at 322.

The velocity triangles depicted by 302, 310, 312, 320, and 322 depict an increase in velocity of the combustion gases 86 induced across the relatively low speed of rotation of the low speed turbine rotor 110. More specifically, the aforementioned velocity triangles schematically depict an exemplary effect of the counter rotation of the low speed turbine rotor 110 in the first direction 161 and the high speed turbine rotor 120 in the second direction 162 opposite of the first direction 161. In one embodiment, the relative velocity of the combustion gases 86 passing across the first stage 101 of the low speed turbine rotor 110, and in reference thereof, at 312 may define a speed of approximately 915 m/s or less at least partially along the circumferential direction C and the longitudinal direction L from the leading edge 175 of the first stage 101 of the low speed turbine rotor 110 to the leading edge 175 of the first high speed turbine stage 102 of the high speed turbine rotor 120. In another embodiment, the mean rotor or airfoil velocity of the high speed turbine rotor 120 is approximately 762 m/s or less. In yet another embodiment, the relative velocity of the combustion gases 86 in reference to the high speed turbine rotor 120 is approximately 152 m/s or less at least partially along the circumferential direction C and the longitudinal direction L.

It should be understood that the graphic representation provided in FIG. 3 may be inverted or otherwise altered such that the first direction 161 is counter-clockwise (when viewed from the downstream end 98 toward the upstream end 99) and the second direction 162 is clockwise.

Figure 4:
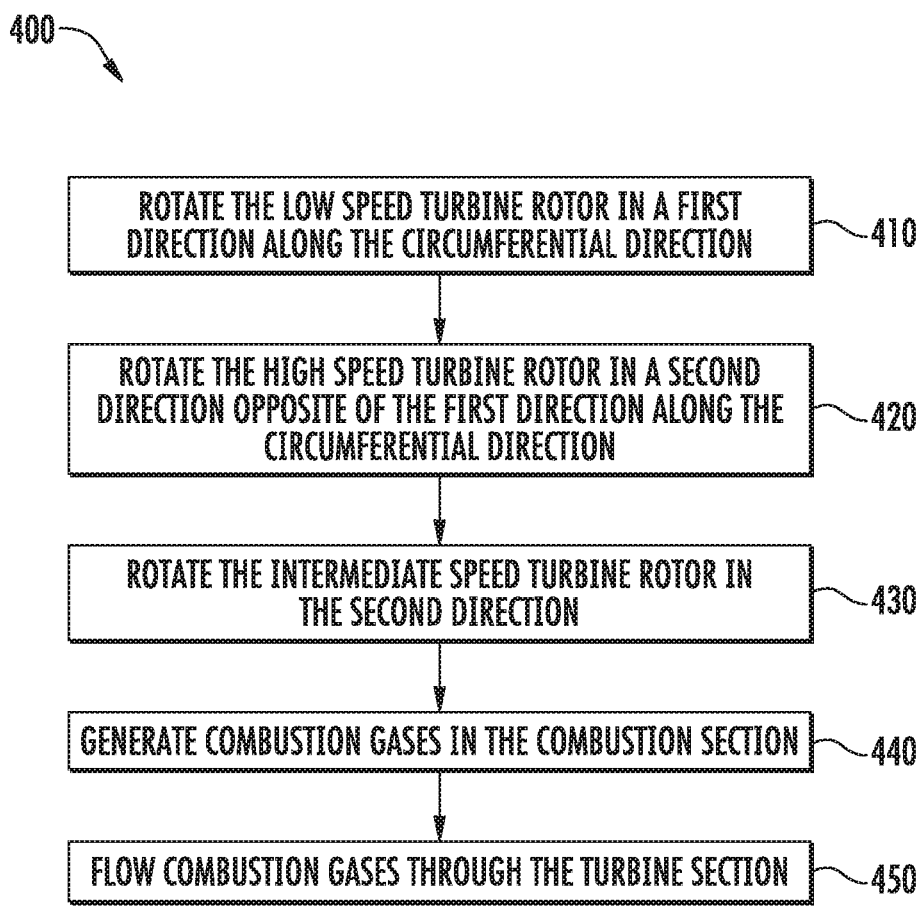
FIG. 4 is a flowchart outlining exemplary steps of a method of operating the engine shown in FIGS. 1-3.

Referring now to FIG. 4, a flowchart outlining exemplary steps of a method of operating an interdigitated turbine engine 400 is generally provided (herein after referred to as "method 400"). The gas turbine engine including an interdigitated turbine section, such as the engine 10 shown and described in regard to FIGS. 1-3, includes a low speed turbine rotor interdigitated with a high speed turbine rotor and an intermediate speed turbine rotor, in which each turbine rotor is connected to and rotatable with a respective shaft, and each respective shaft is connected to and rotatable with a respective fan or compressor. For example, the gas turbine engine including the interdigitated turbine section may define, in serial flow arrangement along the longitudinal direction, the combustion section 26, the low speed turbine rotor 110, the high speed turbine rotor 120, the low speed turbine rotor 110, the intermediate speed turbine rotor 130, and the low speed turbine rotor 110—. The method 400 may outline exemplary steps of operating the interdigitated turbine engine such that a product of the flow area of the turbine section 90 and the square of the rotational speed of one or more rotors 110, 120, 130 of the turbine section 90 may be reduced while reducing the average stage work factor, reducing axial or longitudinal length of the turbine section 90, reducing fuel consumption, and/or providing comparable thrust or power output to longer or larger (i.e. in the longitudinal L and/or radial direction R) turbine sections or engines. Still further, the method 400 may outline exemplary steps of operating a gas turbine engine including an interdigitated turbine section such that adverse or deleterious effects from hot spots in the combustion gases along the circumferential direction C (e.g., spikes in temperature variation along the circumferential direction C) may be mitigated or removed, and/or enable the turbine section to operate based on an average circumferential flowpath temperature in the combustion section rather than a maximum temperature (e.g., hot spots). FIG. 4 depicts steps performed in a particular order for the purposes of illustration and discussion. Those of ordinary skill in the art, using the disclosures provided herein, will understand that various steps of any of the methods disclosed herein may be adapted, modified, rearranged, omitted, or expanded in various ways without deviating from the scope of the present disclosure.

The method 400 may include at 410 rotating the low speed turbine rotor in a first direction along the circumferential direction, at 420 rotating the high speed turbine rotor in a second direction opposite of the first direction along the circumferential direction, and at 430 rotating the intermediate speed turbine rotor in the second direction. For example, the low speed turbine rotor may rotate in the first direction 161 as shown in FIGS. 1-3 and the high speed turbine rotor and intermediate speed turbine rotor may each rotate in the second direction 162. However, it should be appreciated that the first direction 161 may be clockwise or counter-clockwise, and the second direction 162 is counter-clockwise or clockwise (opposite of the first direction 161).

In one embodiment at 410, rotating the low speed turbine rotor in the first direction defines a mean velocity of approximately 152 m/s or less.

In one embodiment at 420, rotating the high speed turbine rotor in the second direction defines a mean velocity of approximately 762 m/s or less.

The method 400 may further include at 440 generating combustion gases in the combustion section, and at 450 flowing the combustion gases through the combustion section (e.g. combustion gases 86 in the combustion section 26 shown and described in regard to FIGS. 1-4).

In one embodiment at 450, flowing combustion gases through the turbine section defines a relative velocity of the combustion gases in reference to the rotational speed of the low speed turbine rotor of approximately 305 m/s or less.

In another embodiment at 450, flowing combustion gases through the turbine section defines a relative velocity of the combustion gases passing across the first stage of the low speed turbine rotor and in reference thereof of approximately 915 m/s or less at least partially along the circumferential direction and the longitudinal direction.

In yet another embodiment at 450, flowing combustion gases through the turbine section defines a relative velocity of the combustion gases passing across the first stage of the low speed turbine rotor and in reference to the high speed turbine rotor of approximately 152 m/s or less at least partially along the circumferential direction and the longitudinal direction.

The turbine section 90 shown and described herein may improve upon existing turbine sections by providing improved fuel efficiency, operational efficiency, and/or power output while maintaining or reducing weight, part count, and/or packaging. The plurality of outer shroud airfoils 118 of the low speed turbine rotor 110 interdigitated among the plurality of high speed turbine airfoils 122 of the high speed turbine rotor 120 may reduce packaging and reduce part count by removing stages of stationary airfoils between each rotating component. Additionally, the turbine section 90 may provide efficiency benefits comparable to a reduction gearbox without adding weight or size (e.g. axial length) to the engine 10. The low speed turbine rotor 110, as the first stage downstream of the combustion section 26, may further improve engine efficiency by reducing cooling air appropriated away from producing combustion gases 86, thereby allowing more energy from the compressor section 21 to be used in combustion and operation of the engine 10. Furthermore, removing the nozzle guide vane between the combustion section 26 and the low speed turbine rotor 110 of the turbine section 90 may reduce or eliminate design constraints related to hot spots in the combustion gases along the annulus of the core flowpath 70.

The various embodiments of the turbine section 90 generally shown and described herein may be constructed as individual blades installed into drums or hubs, or integrally bladed rotors (IBRs) or bladed disks, or combinations thereof. The blades, hubs, or bladed disks may be formed of ceramic matrix composite (CMC) materials and/or metals appropriate for gas turbine engine hot sections, such as, but not limited to, nickel-based alloys, cobalt-based alloys, iron-based alloys, or titanium-based alloys, each of which may include, but are not limited to, chromium, cobalt, tungsten, tantalum, molybdenum, and/or rhenium. The turbine section 90, or portions or combinations of portions thereof, including the inner shroud 112, the outer shroud 114, the connecting airfoil(s) 116, the plurality of outer shroud airfoils 118, and/or the plurality of inner shroud airfoils 119, may be formed using additive manufacturing or 3D printing, or casting, forging, machining, or castings formed of 3D printed molds, or combinations thereof. The turbine section 90, or portions thereof, such as stages of the rotating components 110, 120, 130, the outer shroud 114, the inner shroud 112, and/or various shrouds, seals, and other details may be mechanically joined using fasteners, such as nuts, bolts, screws, pins, or rivets, or using joining methods, such as welding, brazing, bonding, friction or diffusion bonding, etc., or combinations of fasteners and/or joining methods. Still further, it should be understood that the low speed turbine rotor 110, including the inner and/or outer shroud 112, 114, may incorporate features that allow for differential expansion. Such features include, but are not limited to, aforementioned methods of manufacture, various shrouds, seals, materials, and/or combinations thereof.

The systems and methods shown in FIGS. 1-4 and described herein may decrease fuel consumption, increase operability, increase engine performance and/or power output while maintaining or reducing weight, part count, and/or packaging (e.g. radial and/or axial dimensions). The systems provided herein may allow for increased high bypass ratios and/or overall pressure ratios over existing gas turbine engine configurations, such as turbofans, while maintaining or reducing packaging relative to other gas turbine engines of similar power output. The systems described herein may contribute to improved bypass ratio and/or overall pressure ratio and thereby increase overall gas turbine engine efficiency. The systems provided herein may increase overall gas turbine engine efficiency by reducing or eliminating stationary airfoils that require cooling air (e.g. nozzle guide vane). Additionally, the systems provided herein may reduce gas turbine engine packaging and weight, thus increasing efficiency, by reducing rotating and/or stationary airfoil quantities (e.g. blades and/or vanes) by approximately 40% or more over gas turbine engines of similar size and/or power output.

Still further, the systems and methods shown in FIGS. 1-4 and described herein may reduce a product of a flow area and the square of the rotational speed (the product herein referred to as "$AN^2$") of the gas turbine engine. For example, engine 10 shown and described in regard to FIGS. 1-3 may generally reduce $AN^2$ relative to a conventional geared turbofan configuration. Generally, lowering the $AN^2$, such as by reducing the rotational speed and/or the flow area, increases the required average stage work factor (i.e. the average required loading on each stage of rotating airfoils). However, the systems described herein may lower the $AN^2$ while also lowering the average stage work factor and maintaining axial length of the turbine section 90 (compared to engines of similar thrust output and packaging) by interdigitating the low speed turbine rotor 110 among the one or more stages of the high speed turbine rotor 120 and the intermediate speed turbine 130 while also defining a non-digitated turbine structure (i.e. the inner shroud 112 and the plurality of inner shroud airfoils 119) toward the downstream end 98 of the turbine section 90. Therefore, the low speed turbine rotor 110 may increase the quantity of rotating stages of airfoils while reducing the average stage work factor, and therefore the $AN^2$, while mitigating increases in axial length to produce a similar $AN^2$ value. The low speed turbine rotor 110 may further reduce the $AN^2$ while additionally reducing the overall quantity of airfoils, rotating and stationary, in the turbine section 90 relative to turbine sections of gas turbine engines of similar power output and/or packaging.

Furthermore, the systems and methods shown in FIGS. 1-4 and described herein may further improve engine efficiency, reduce airfoil quantity, reduce engine weight, and/or alleviate combustion section design constraints by interdigitating the low speed turbine rotor 110 forward or upstream 99 of the high speed turbine rotor 120. For example, defining the first stage of the low speed turbine rotor 110 as immediately downstream 98 of the combustion section 26, without a first turbine vane or nozzle guide vane therebetween, as well as defining the low speed turbine rotor 110 in counter-rotation with the high speed turbine rotor 120, may reduce effects of overall combustion hot spots on the first stage of the low speed turbine rotor 110 in contrast to a stationary, first turbine vane or nozzle guide vane. As such, the turbine section 90 and engine 10 described herein may remove constraints to combustion section 26 design by de-emphasizing hot spots, or combustion pattern factor, in favor of other design criteria, such as decreasing emissions, improving lean blow-out (LBO) and/or altitude re-light, improving overall operability across part or all of an operating envelope, or increasing the operating envelope.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a gas turbine engine with an interdigitated turbine section, wherein the gas turbine engine defines a longitudinal direction, a radial direction, and a circumferential direction, and an upstream end and a downstream end along the longitudinal direction, wherein the gas turbine engine comprises a fan rotor, an intermediate pressure compressor, a high pressure compressor, a combustion section configured to form combustion gasses, and a turbine section through which the combustion gases flow in serial flow arrangement, wherein the turbine section comprises a lows speed turbine rotor configured to rotate in a first direction and interdigitated with a high speed turbine rotor, wherein the high speed turbine rotor is configured to rotate in a second direction opposite of the first direction and wherein the gas turbine engine comprises, in serial flow arrangement from the upstream end to the downstream end, a first stage of the low speed turbine rotor immediately downstream of the combustion section, a first stage of the high speed turbine rotor, a second stage of the low speed turbine rotor, and one or more additional stages of the low speed turbine rotor, the low speed turbine rotor coupled to the fan rotor via a low pressure shaft, and the high speed turbine rotor coupled to the high pressure compressor via a high pressure shaft, wherein the low speed turbine rotor comprise a connecting airfoil coupling an outer shroud to an inner shroud, the method comprising:
   rotating the low speed turbine rotor in the first direction along the circumferential direction; and
   rotating the high speed turbine rotor in the second direction opposite of the first direction along the circumferential direction.

2. The method of claim 1, further comprising:
   generating combustion gases in the combustion section; and
   flowing combustion gases through the turbine section.

3. The method of claim 2, wherein flowing combustion gases through the turbine section defines a relative velocity of the combustion gases in reference to a rotational speed of the low speed turbine rotor at least partially in the circumferential direction and in the longitudinal direction.

4. The method of claim 3, wherein flowing combustion gases through the turbine section defines a relative velocity of approximately 305 m/s or less of the combustion gases relative to the rotational speed of the low speed turbine rotor.

5. The method of claim 3, wherein rotating the low speed turbine rotor in the first direction defines a mean velocity of approximately 152 m/s or less.

6. The method of claim 3, wherein rotating the high speed turbine rotor in the second direction defines a mean velocity of approximately 762 m/s or less.

7. The method of claim 3, wherein flowing combustion gases through the turbine section defines a relative velocity of the combustion gases of approximately 915 m/s or less exiting the first stage of the low speed turbine rotor and relative to the first stage of the low speed turbine rotor.

8. The method of claim 3, wherein flowing combustion gases through the turbine section defines a relative velocity of the combustion gases of approximately 305 m/s or less entering the first stage of the high speed turbine rotor, wherein the relative velocity is relative to the first stage of the high speed turbine rotor of approximately 152 m/s or less at least partially along the circumferential direction and the longitudinal direction.

9. A gas turbine engine, wherein the gas turbine engine defines a longitudinal direction, a radial direction, and a circumferential direction, and an upstream end and a downstream end along the longitudinal direction, the gas turbine engine comprising:
   a combustion section configured to form combustion gases; and
   a turbine section through which the combustion gases flow, the turbine section comprising a low speed turbine rotor configured to rotate in a first direction and interdigitated with a high speed turbine rotor, wherein the high speed turbine rotor is configured to rotate in a second direction opposite of the first direction, and wherein the gas turbine engine comprises, in serial flow arrangement from the upstream end to the downstream end, the combustion section, a first stage of the low speed turbine rotor immediately downstream of the combustion section, a first stage of the high speed turbine rotor, and a second stage of the low speed turbine rotor, wherein the low speed turbine rotor comprises a connecting airfoil coupling an outer shroud to an inner shroud.

10. The gas turbine engine of claim 9, wherein the engine defines a relative velocity of the combustion gases in reference to a rotational speed of the low speed turbine rotor at least partially in the circumferential direction and in the longitudinal direction.

11. The gas turbine engine of claim 10, wherein the engine defines a relative velocity of approximately 305 m/s or less of the combustion gases relative to the rotational speed of the low speed turbine rotor.

12. The gas turbine engine of claim 10, wherein the low speed turbine rotor is configured to rotate in the first direction at a mean velocity of approximately 152 m/s or less.

13. The gas turbine engine of claim 10, wherein the high speed turbine rotor is configured to rotate in the second direction at a mean velocity of approximately 762 m/s or less.

14. The gas turbine engine of claim 10, wherein the engine defines a relative velocity of the combustion gases of approximately 915 m/s or less exiting the first stage of the low speed turbine rotor, wherein the relative velocity is relative to the first stage of the low speed turbine rotor.

15. The gas turbine engine of claim 10, wherein the engine defines a relative velocity of the combustion gases of approximately 305 m/s or less entering the first stage of the high speed turbine rotor, wherein the relative velocity is relative to the first stage of the high speed turbine rotor.

16. The gas turbine engine of claim 9, comprising an intermediate speed turbine rotor interdigitated with the low speed turbine rotor.

17. The gas turbine engine of claim 9, comprising:
   a compressor section comprising a high pressure compressor and an intermediate pressure compressor; and
   a fan assembly comprising one or more rotatable fan stages, wherein the low speed turbine rotor is connected and rotatable with the fan assembly, and wherein the high speed turbine rotor is connected and rotatable with the high pressure compressor, and further wherein the intermediate speed turbine rotor is connected and rotatable with the intermediate pressure compressor.

18. The gas turbine engine of claim 17, wherein the fan assembly comprises a fan rotor and a gearbox.

19. The gas turbine engine of claim 9, wherein the low speed turbine rotor defines between 1 and 10 stages.

20. The gas turbine engine of claim 19, wherein the low speed turbine rotor defines between 1 and 5 stages aft or downstream of the connecting airfoil.

* * * * *